(12) United States Patent
Imao et al.

(10) Patent No.: US 6,286,380 B1
(45) Date of Patent: Sep. 11, 2001

(54) AUTOMATIC SPEED-CHANGE APPARATUS FOR A GEAR TRANSMISSION

(75) Inventors: Toshio Imao; Eiji Takeyama, both of Nagoya (JP)

(73) Assignee: Aichi Kikai Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/439,495

(22) Filed: Nov. 12, 1999

(30) Foreign Application Priority Data

Nov. 13, 1998 (JP) .................................................. 10-341025

(51) Int. Cl.$^7$ ........................... F16H 59/00; F16H 61/00; F16H 63/00
(52) U.S. Cl. ............................................. 74/335; 74/336 R
(58) Field of Search ................................ 74/337, 336 R, 74/335

(56) References Cited

U.S. PATENT DOCUMENTS

| | | | |
|---|---|---|---|
| 5,724,856 | * 3/1998 | Back | 74/335 |
| 5,901,608 | * 5/1999 | Takeyama | 74/335 |
| 6,003,395 | * 12/1999 | Rogg et al. | 74/335 |

FOREIGN PATENT DOCUMENTS

| | | |
|---|---|---|
| 6151697 | 11/1986 | (JP) . |
| 405118495 | * 5/1993 | (JP) . |

* cited by examiner

*Primary Examiner*—Sherry Estremsky
*Assistant Examiner*—Tisha D. Lewis
(74) *Attorney, Agent, or Firm*—Dennison, Scheiner, Schultz & Wakeman

(57) ABSTRACT

A select mechanism for executing select operation and a change speed mechanism for executing change speed operation are incorporated into the automatic speed-change apparatus. The change speed mechanism is provided with a change speed motor 14 capable of controlling forward and backward rotation, a single or a plurality of intermediate shaft gear mechanisms 16 reducing and then transmitting the speed of the rotation of the speed change motor and each consisting of a large diameter gear 17, a small diameter gear 18 and an intermediate shaft 19 parallel to a select and change speed pull-rod 2, a change speed gear 24 engaged with the intermediate shaft gear mechanisms to transmit rotation and fixed to the select and change speed pull-rod 2, and a change speed sensor 28 provided on the outer end of the select and change speed pull-rod 2 and detecting the operating angle of the pull-rod 2 in rotation direction.

3 Claims, 2 Drawing Sheets

AUTOMATIC SPEED-CHANGE APPARATUS FOR A GEAR TRANSMISSION

BACKGROUND OF THE INVENTION

1. Field of the Invention

The present invention relates to an automatic speed-change apparatus for automatically changing the speed of a gear transmission.

2. Description of the Related Art

There has been provided an apparatus in which a manual gear transmission mechanism is used as it is and speed-change and clutch operations are automated through a hydraulic apparatus by computer control. This apparatus, however, requires three cylinders for clutch, shift and select operations, and a number of solenoid valves for driving these cylinders as well as a hydraulic system. Due to this, the apparatus has disadvantages in complicated structure, large size and high cost.

In addition, there has been provided an apparatus in which motors are employed to the select and change speed actuators for a gear transmission, as disclosed by, for example, Japanese Patent Publication No. 61-51697. This apparatus, however, requires as many motors as select lines and a plurality of motors and solenoid valves are used. Due to this, this apparatus has disadvantages in complicated structure, large size and high cost.

SUMMARY OF THE INVENTION

The present invention has been made in view of the above conventional disadvantages. It is, therefore, an object of the present invention to provide an automatic speed-change apparatus for a gear transmission which is simple in structure and can be manufactured at low cost.

According to the present invention, there is provided an automatic speed-change apparatus for a gear transmission, connected to a select and change speed pull-rod of the gear transmission having a constitution in which the select and change speed pull-rod is moved in an axial direction to select a line of a change speed fork provided within the gear transmission and a rotation direction of the select and change speed pull-rod cooperates with the change speed fork to complete speed change of a gear, for executing select and change speed operations of the gear transmission, wherein a select mechanism for executing the select operation and a change speed mechanism for executing the change speed operation are incorporated into the automatic speed-change apparatus; the select mechanism comprises a select shaft rotated by a select motor capable of controlling forward and backward rotation, a select sensor provided on an outer end of the select shaft and detecting an operating angle of the select shaft in rotation direction, a select lever fixed to the select shaft and a connector connecting a tip end portion of the select lever to the select shaft; the change speed mechanism comprises a change speed motor capable of controlling forward and backward rotation; a plurality of intermediate shaft gear mechanisms each having a large diameter gear, a small diameter gear and an intermediate shaft parallel to the select and change speed pull-rod; a change speed gear engaged with the intermediate shaft gear mechanism to transmit rotation and fixed to the select and change speed pull-rod; and a change speed sensor provided on an outer end of the select and change speed rod and detecting an operating angle of the select and change speed pull-rod in the rotation direction; during the select operation, when the select motor is actuated, the select shaft is deformed in the rotation direction to rock the select lever and to axially move the select and change speed pull-rod through the connector and the select shaft is adjusted by feedback control of the select sensor to thereby allow the select shaft to reach a predetermined select line; and during the change speed operation, when the change speed motor is actuated, the change speed gear is rocked through the intermediate shaft gear mechanisms and the select and change speed pull-rod is deformed in the rotation direction and adjusted by feedback control of the change speed sensor to thereby allow the select and change speed pull-rod to reach a predetermined change speed line.

Two pairs of a first intermediate shaft gear mechanism and a second intermediate shaft gear mechanism may be provided in the change speed mechanism between an output shaft of the change speed motor and the select and change speed pull-rod to thereby constitute a first reduction gear mechanism, a second reduction gear mechanism and a third reduction gear mechanism from a change speed motor side in this order and a main body of the change speed motor is provided at the gear transmission side; the shift mechanism is provided with a small diameter change speed gear fixed to the output shaft of the change shaft motor and a large diameter change speed gear engaged with the small diameter gear of the second intermediate shaft gear mechanism to transmit rotation and fixed to the select and change speed pull-rod, the first intermediate shaft gear mechanism engaged with the small diameter change speed gear to transmit rotation and having a large diameter gear provided at a gear transmission side and a small diameter gear provided at an opposite side to the gear transmission, the second intermediate shaft gear mechanism engaged with the small diameter gear of the first intermediate shaft gear mechanism and having a large diameter gear at an opposite side to the gear transmission and a small diameter gear provided at the gear transmission side; a center distance of the first reduction gear mechanism is set slightly shorter than a center distance of the second reduction gear mechanism, the center distance of the second reduction gear mechanism is set equal to a center distance of the third reduction gear mechanism, the first, second and third reduction gear mechanisms have equal gear specifications, the numbers of gear teeth of the small diameter gears of the respective reduction gear mechanisms are the same, only the number of gear teeth of the large diameter gear of the first reduction gear mechanism is set so as not to interfere with the small diameter gear of the second reduction gear mechanism.

Gear teeth surface portions, shaft portions, bearing portions of the gears and the tip end portion of the lever and a connector portion constituting the select mechanism and the change speed mechanism may be dry structure using a material or a solid lubricant to allow the select mechanism and the change speed mechanism to function without using a liquid lubricant.

Preferably, gear specifications of the intermediate gears are set such that the gears are spur gears and have modules set at 1 to 3, a pair of reduction ratios are 3 to 6, numbers of gear teeth of the small diameter gears are 10 to 20, numbers of gear teeth of the large diameter gears are 30 to 120 and that a total reduction ratio is 48 to 180.

DESCRIPTION OF THE PREFERRED EMBODIMENT

Now, the embodiment of the present invention will be described with reference to the accompanying drawings.

Figure 1:
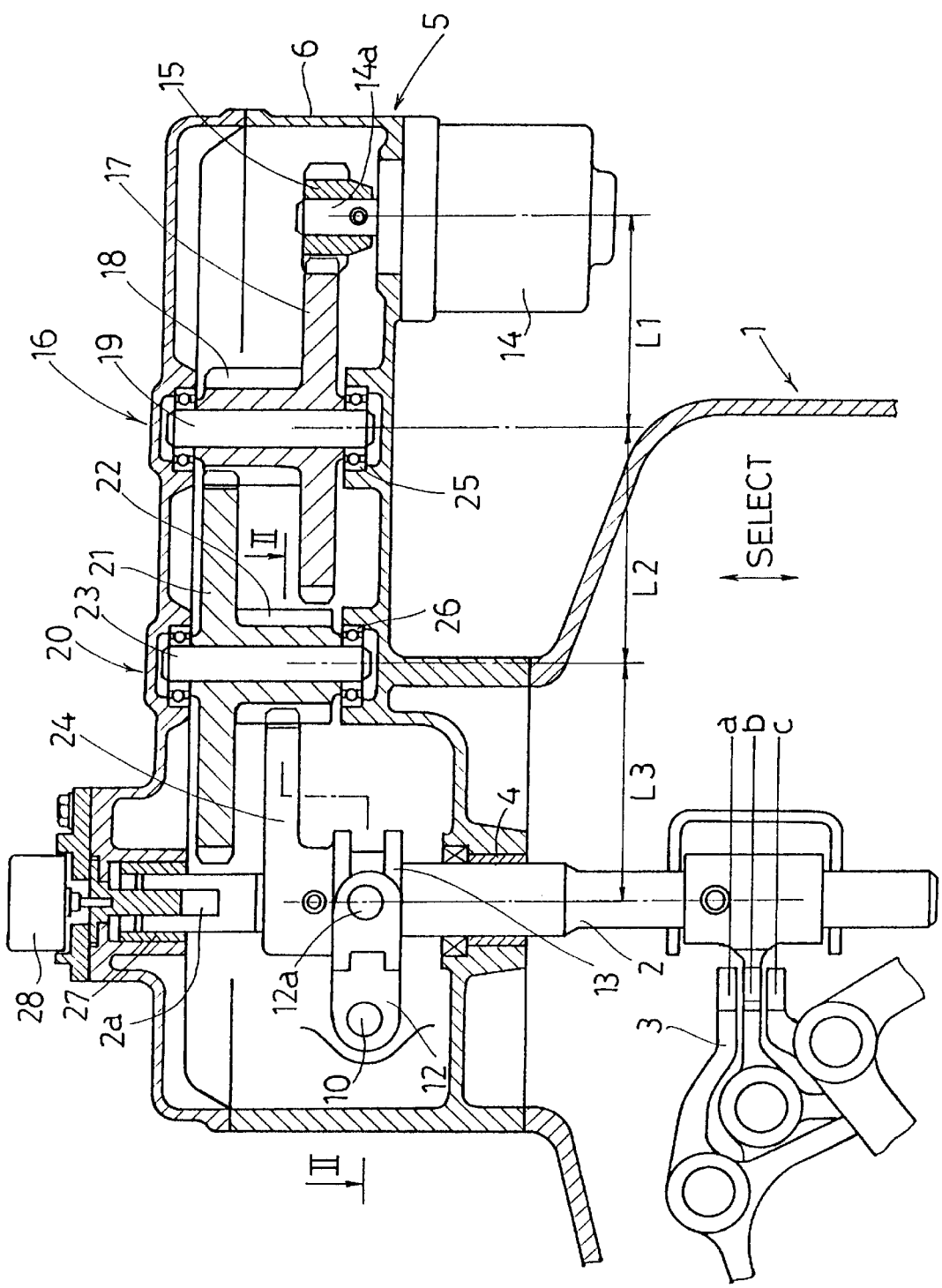
FIG. 1 is a cross-sectional block diagram of an automatic speed-change apparatus provided at a gear transmission according to a preferred embodiment of the present invention.
Figure 2:
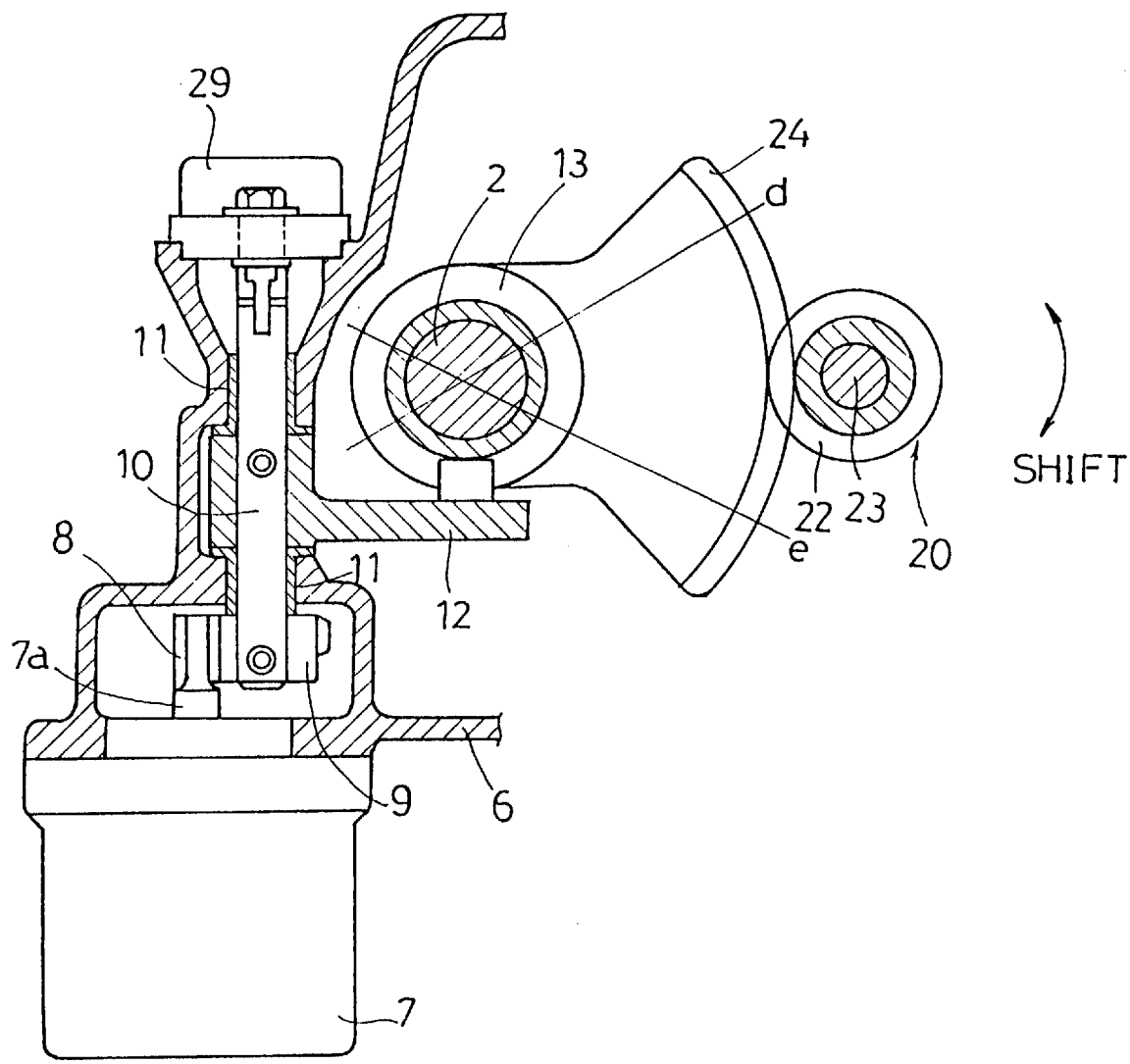
FIG. 2 is a cross-sectional view taken along line II—II of FIG. 1.

FIG. 1 is a cross-sectional block diagram showing the important parts of an automatic speed-change apparatus coupled to a gear transmission. FIG. 2 is a cross-sectional view taken along line II—II of FIG. 1.

As shown therein, a select and change speed pull-rod 2 is provided in a gear transmission 1. A change speed fork 3 is coupled to the select and change speed rod 2. The tip end portion of the select and change speed pull-rod 2 is protruded externally from a bearing 4 and an automatic speed-change apparatus 5 is connected to the select and change speed pull-rod 2 protruded externally. The automatic speed-change apparatus 5 causes the select and change speed pull-rod 2 to axially move to thereby execute a select operation. In addition, the select and change speed pull-rod 2 is rotated in rotating direction to execute speed change operation within the gear transmission 1. As shown in FIG. 1, when the select and change speed pull-rod 2 is actuated in axial direction and moved to a position a, the fifth speed or a retreat position is selected. When the rod 2 is moved to a position b, the third or fourth speed is selected. When the rod 2 is moved to a position c, the first or second speed is selected. After the select operation, if the select and change speed pull-rod 2 is axially moved to a position d or e shown in FIG. 2, speed is changed to the second, fourth speed or a retreat position at the position d and changed to the first, third or fifth speed at the position e. A select mechanism for executing select operation and a change speed mechanism for executing change speed operation are incorporated into the automatic speed-change apparatus 5 for executing the select and change speed operations. First, description will be given to the select mechanism. As shown in FIG. 2 of the cross-sectional view taken along line II—II of FIG. 1, a select motor 7 is attached to a case 6 of the automatic speed-change apparatus 5. A select motor gear 8 is fixed to an output shaft 7a of the select motor 7. A select gear 9 is engaged with the select motor gear 8 and fixed to the tip end of a select shaft 10. The select shaft 10 is rotatably provided through metal bearings 11 and 11. A select bar 12 is fixed to the outer periphery of the select shaft 10 between the metal bearings 11. A tip end portion 12a protruded on the tip end of the select bar 12 is engaged with a connector 13. The connector 13 is formed integrally with a shift gear 24 fixedly fitted around the select and change speed pull-rod 2. When the select shaft 10 is rotated, the tip end portion 12a of the select bar 12 engaged with the grooves of the connector 13 is rocked. Then, the select and change speed pull-rod 2 shown in FIG. 1 is moved in axial direction, thereby executing select operation.

A select sensor 29 is provided on the outer end of the select shaft 10 shown in FIG. 2. The select sensor 29 consists of a rotation angle sensor capable of detecting the operating angle of the select shaft 10 in the rotating direction up to 90°. The select sensor 29 outputs a detection signal to a controller which is not shown in FIG. 2. The controller inputs this signal and feedback-controls the select motor 7 which rotates the select shaft 10 so that the select shaft 10 reaches a predetermined select line.

Next, the change speed mechanism will be described with reference to FIG. 1. The main body of the change speed motor 14 is attached to the case 6 of the automatic speed-change apparatus 5 and arranged to protrude toward the gear transmission 1. The output shaft 14a of the output shaft 14 is arranged in parallel to the select and change speed pull-rod 2. A small diameter change speed motor gear 15 is fitted around the output shaft 14a. A large diameter gear 17 is engaged with the small diameter change speed motor gear 15. The large diameter gear 17 is fitted around the first intermediate shaft 19. A small diameter gear 18 consisting of a long gear is formed integrally with the large diameter gear 17. The intermediate shaft 19, the large diameter gear 17 and the small diameter gear 18 constitute a first intermediate shaft gear mechanism 16.

The intermediate gear 19 is rotatably supported by a ball bearing 25. A large diameter gear 21 of a second intermediate shaft gear mechanism 20 is engaged with the small diameter gear 18 of the first intermediate shaft gear mechanism 16. A small diameter gear 22 consisting of a long gear is formed integrally with the large diameter gear 21 of the second intermediate shaft gear mechanism 20 and fitted around an intermediate shaft 23. The intermediate shaft 23 is rotatably supported by a ball bearing 26. The second intermediate shaft gear mechanism 20 and the first intermediate shaft gear mechanism 16 are parallel to each other and also parallel to the output shaft 14a of the change speed motor 14 and to the select and change speed pull-rod 2. The large diameter shift gear 24 is engaged with the small diameter gear 22 of the second intermediate shaft gear mechanism 20.

A slit 2a is axially formed into a groove shape at the outer end side of the select and change speed pull-rod 2. A change speed sensor 28 is arranged to be inserted into the slit 2a and constituted that even if the select and change speed pull-rod 2 is moved axially, the pull-rod 2 does not abut against the change speed sensor 28. The change speed sensor 28 consists of a rotation angle sensor capable of detecting the operating angle of the select and change speed pull-rod 2 in rotation direction up to 90°. The change speed sensor 28 detects the operating angle of the select and change speed pull-rod 2 in rotation direction and feeds a signal to the controller. Using the signal, the controller feedback-controls the change speed motor 14 such that the rotation angle of the select and change speed pull-rod 2 can reach a predetermined change speed line.

A first reduction gear mechanism is constituted by the change speed motor gear 15 at the change speed motor 14 side and the first intermediate shaft gear mechanism 16. A second reduction gear mechanism is constituted by the first intermediate shaft gear mechanism 16 and the second intermediate shaft gear mechanism 20. A third reduction gear mechanism is constituted by the second intermediate shaft gear mechanism 20 and the select and change speed pull-rod 2. Thus, the rotation of the change speed motor 14 is reduced and the reduced rotation is transmitted to the select and change speed pull-rod 2. To this end, the center distance L1 of the first reduction gear mechanism is set shorter than the center distance L2 of the second reduction gear mechanism and the center distance L2 of the second reduction gear mechanism is set equal to the center distance L3 of the third reduction gear mechanism.

The number of the gear teeth of the change speed motor gear 15, that of the gear teeth of the small diameter gear 18 of the first intermediate shaft gear mechanism 16 and that of the gear teeth of the small diameter gear 22 of the second intermediate shaft gear mechanism 20 are set equal to one another. The number of the gear teeth of the large diameter gear 21 of the second intermediate shaft gear mechanism 20 and that of the gear teeth of the shift gear 24 are set equal to each other. The number of the gear teeth of the large diameter gear 17 of the first intermediate shaft gear mechanism 16 is set smaller than that of the gear teeth of the large diameter gear 21 of the second intermediate shaft gear mechanism 20 so that the large diameter gear 17 of the first intermediate shaft gear mechanism 16 does not interfere with the small diameter gear 22 of the second intermediate shaft gear mechanism 20.

For example, if the rotation angle of the select and change speed pull-rod 2 necessary to change the speed of the change speed fork 3 within the gear transmission 1 from a present speed to a target speed is 1/7 rotation (about 51°), the reduction ratio of the first reduction gear mechanism is 4, that of the second reduction gear mechanism is 5 and that of the third reduction gear mechanism is 5. Thus, the overall reduction ratio amounts to 100. The entire rotation frequency of the change speed motor 14 necessary for changing speed is 100 times as high as 1/7, i.e., about 14, which numeric value falls within a practical range. Accordingly, if a commercially available DC motor (capacity: 8 kgcm/8000 rpm; rating: 4 kgcm/4000 rpm) is employed, the speed change time between the respective speeds is 0.3 to 0.4 seconds.

The small diameter gears 18 and 22 and large diameter gears 17 and 21 of the first intermediate shaft gear mechanism 16 and the second intermediate shaft gear mechanism 20, respectively are spur gears and have modules set at 1 to 3. The numbers of the gear teeth of the small diameter gears 18 and 22 are 10 to 20, respectively. The numbers of the gear teeth of the large diameter gears 17 and 21 are set at 30 to 120. The overall reduction ratio from the change speed motor gear 15 to the select and change speed pull-rod 2 can be set to fall between 48 and 180.

The small diameter gears 18 and 22, the large diameter gears 17 and 21, the change speed motor gear 15, the change speed gear 24 and the like are made of nylon resin. The metal bearings 4, 11 and 27 are made of PPFE resin. The ball bearings 25 and 26 are grease sealed type bearings. The tip end portion 12*a* of the select bar 12 and the connector 13 can be connected by using polyimide resin or coating grease or the like without using liquid lubricating oil to thereby provide a dry connection part therebetween which can prevent leakage of oil.

The connector 13 may be formed directly at the select and change speed pull-rod 2.

In this embodiment, the first intermediate shaft gear mechanism 16 and the second intermediate shaft gear mechanism 20 are arranged in parallel to the change speed motor 14 and the select and change speed pull-rod 2 and formed out of spur gears, respectively. This makes it possible to make the structure of the apparatus simple, to manufacture the apparatus at low cost and to form the select sensor 29 and the change speed sensor 28 out of rotation angle sensors, respectively. It is, therefore, possible to conduct feedback control with high accuracy.

Further, since the change speed motor 14 is provided to be close to the gear transmission 1, the apparatus becomes compact and can be better mounted into a vehicle. Vibration acting on the change speed motor 14 is reduced and durability enhances.

Moreover, since the large diameter gear 17 of the first intermediate shaft gear mechanism 16 is provided at the change speed motor 14 side, the position of the change speed gear becomes closer to the main body of the change speed motor 14. Thus, the overhang of the output shaft 14*a* of the change speed motor 14 is little and good durability can be provided.

Additionally, since only the numbers of the gear teeth of the large diameter gears 17 and 21 of the two intermediate shaft gear mechanisms 16 and 20 are made different and the remaining constitutions are the same in specifications and made of the same components. Due to this, the number of types of components can be reduced and the apparatus can be manufactured at low cost. The reduction ratios of the three pairs of reduction gear mechanisms are set to be the same. Due to this, only two pairs of intermediate shaft gear mechanisms 16 and 20 may be provided, the number of components per necessary entire reduction ratio is reduced, the components become compact in size and the sizes of the large diameter gears 17 and 21 are not increased more than needed. Thus, the gears are less tilted and good durability can be ensured. Besides, since the apparatus is set to be dry, oil does not leak to thereby realize a maintenance-free apparatus.

The present invention is an automatic speed-change apparatus for a gear transmission, connected to a select and change speed pull-rod of the gear transmission having a constitution in which the select and change speed pull-rod is moved in an axial direction to select a line of a change speed fork provided within the gear transmission and a rotation direction of the select and change speed pull-rod cooperates with the change speed fork to complete speed change of a gear, for executing select and change speed operations of the gear transmission, wherein a select mechanism for executing the select operation and a change speed mechanism for executing the change speed operation are incorporated into the automatic speed-change apparatus; the select mechanism comprises a select shaft rotated by a select motor capable of controlling forward and backward rotation, a select sensor provided on an outer end of the select shaft and detecting an operating angle of the select shaft in rotation direction, a select lever fixed to the select shaft and a connector connecting a tip end portion of the select lever to the select shaft; the change speed mechanism comprises a change speed motor capable of controlling forward and backward rotation; a plurality of intermediate shaft gear mechanisms each having a large diameter gear, a small diameter gear and an intermediate shaft parallel to the select and change speed pull-rod; a change speed gear engaged with the intermediate shaft gear mechanism to transmit rotation and fixed to the select and change speed pull-rod; and a change speed sensor provided on an outer end of the select and change speed rod and detecting an operating angle of the select and change speed pull-rod in the rotation direction; during the select operation, when the select motor is actuated, the select shaft is deformed in the rotation direction to rock the select lever and to axially move the select and change speed pull-rod through the connector and the select shaft is adjusted by feedback control of the select sensor to thereby allow the select shaft to reach a predetermined select line; and during the change speed operation, when the change speed motor is actuated, the change speed gear is rocked through the intermediate shaft gear mechanisms and the select and change speed pull-rod is deformed in the rotation direction and adjusted by feedback control of the change speed sensor to thereby allow the select and change speed pull-rod to reach a predetermined change speed line. With this constitution, the present invention has advantages in that the apparatus can be manufactured with simple structure at low cost and the seed of the gear transmission can be automatically changed well.

Further, two pairs of a first intermediate shaft gear mechanism and a second intermediate shaft gear mechanism are provided in the change speed mechanism between an output shaft of the change speed motor and the select and change speed pull-rod to thereby constitute a first reduction gear mechanism, a second reduction gear mechanism and a third reduction gear mechanism from a change speed motor side in this order and a main body of the change speed motor is provided at the gear transmission side; the shift mechanism is provided with a small diameter change speed gear fixed to the output shaft of the change shaft motor and a large diameter change speed gear engaged with the small diameter gear of the second intermediate shaft gear mechanism to transmit rotation and fixed to the select and change speed pull-rod, the first intermediate shaft gear mechanism engaged with the small diameter change speed gear to transmit rotation and having a large diameter gear provided at a gear transmission side and a small diameter gear provided at an opposite side to the gear transmission, the second intermediate shaft gear mechanism engaged with the small diameter gear of the first intermediate shaft gear mechanism and having a large diameter gear at an opposite side to the gear transmission and a small diameter gear provided at the gear transmission side; a center distance of the first reduction gear mechanism is set slightly shorter than a center distance of the second reduction gear mechanism, the center distance of the second reduction gear mechanism is set equal to a center distance of the third reduction gear mechanism, the first, second and third reduction gear mechanisms have equal gear specifications, the numbers of gear teeth of the small diameter gears of the respective reduction gear mechanisms are the same, only the number of gear teeth of the large diameter gear of the first reduction gear mechanism is set so as not to interfere with the small diameter gear of the second reduction gear mechanism. With this constitution, the present invention has advantages in that the apparatus is made compact and can be well mounted into a vehicle, durability improves, the number of components can be reduced, the number of types of components can be reduced and the apparatus can be manufactured at low cost.

Gear teeth surface portions, shaft portions, bearing portions of the gears and the tip end portion of the lever and a connector portion constituting the select mechanism and the change speed mechanism are dry structure using a material or a solid lubricant to allow the select mechanism and the change speed mechanism to function without using a liquid lubricant. Thus, oil leakage can be avoided and a maintenance-free apparatus can be provided.

The gear specifications of the intermediate gears are set such that the gears are spur gears and have modules set at 1 to 3, a pair of reduction ratios are 3 to 6, numbers of gear teeth of the small diameter gears are 10 to 20, numbers of gear teeth of the large diameter gears are 30 to 120 and that a total reduction ratio is 48 to 180. By these settings, the number of types of components can be reduced, the apparatus can be manufactured at low cost, the number of components per necessary entire reduction ratio is small, the apparatus can be made compact and the sizes of the large diameter gears are not increased more than needed. Thus, the gears are less tilted and good durability can be ensured.

What is claimed is:

1. An automatic speed-change apparatus for a gear transmission connected to a select and change speed pull-rod of the gear transmission having a constitution in which the select and change speed pull-rod is moved in an axial direction to select a line of a change speed fork provided within the gear transmission and a rotation direction of said select and change speed pull-rod cooperates with said change speed fork to complete speed change of a gear, for executing select and change speed operations of the gear transmission, said automatic speed-change apparatus comprising:

a select mechanism for executing said select operation and a change speed mechanism for executing said change speed operation;

said select mechanism comprises a select shaft rotated by a select motor capable of having a controlled clockwise and counter clockwise rotation, a select sensor provided on an outer end of the select shaft and detecting an operating angle of the select shaft in rotation direction, a select lever fixed to said select shaft and a connector connecting a tip end portion of the select lever to said select shaft;

said change speed mechanism comprises a change speed motor capable of controlling forward and backward rotation;

a plurality of intermediate shaft gear mechanisms each having a large diameter gear, a small diameter gear and an intermediate shaft parallel to the select and change speed pull-rod; a change speed gear engaged with the intermediate shaft gear mechanism to transmit rotation and fixed to said select and change speed pull-rod; and a change speed sensor provided on an outer end of said select and change speed rod and detecting an operating angle of the select and change speed pull-rod in the rotation direction;

two pairs of a first intermediate shaft gear mechanism and a second intermediate shaft gear mechanism are provided in said change speed mechanism between an output shaft of said change speed motor and said select and change speed pull-rod to thereby constitute a first reduction gear mechanism, a second reduction gear mechanism and a third reduction gear mechanism from a change speed motor side in this order and a main body of said change speed motor is provided at said gear transmission side; said shift mechanism is provided with a small diameter change speed gear fixed to the output shaft of said change shaft motor and a large diameter change speed gear engaged with the small diameter gear of said second intermediate shaft gear mechanism to transmit rotation and fixed to said select and change speed pull-rod, said first intermediate shaft gear mechanism engaged with the small diameter change speed gear to transmit rotation and having a large diameter gear provided at a gear transmission side and a small diameter gear provided at an opposite side to the gear transmission, said second intermediate shaft gear mechanism engaged with the small diameter gear of said first intermediate shaft gear mechanism and having a large diameter gear at an opposite side to said gear transmission and a small diameter gear provided at said gear transmission side;

a center distance of said first reduction gear mechanism is set slightly shorter than a center distance of said second reduction gear mechanism, the center distance of said second reduction gear mechanism is set equal to a center distance of said third reduction gear mechanism, the first, second and third reduction gear mechanisms have equal gear specifications, the numbers of gear teeth of the small diameter gears of the respective reduction gear mechanisms are the same, only the number of gear teeth of the large diameter gear of said first reduction gear mechanism is set so as not to interfere with the small diameter gear of said second reduction gear mechanism;

during the select operation, when the select motor is actuated, said select shaft rotates in a direction to rock said select lever and to axially move said select and change speed pull-rod through said connector and said select shaft is adjusted by feedback control of said select sensor to thereby allow said select shaft to reach a predetermined select line; and during the change speed operation, when the change speed motor is actuated, said change speed gear is rocked through said intermediate shaft gear mechanisms and said select and change speed pull-rod rotates in a direction and adjusted by feedback control of said change speed sensor to thereby allow the select and change speed pull-rod to reach a predetermined change speed line.

2. The automatic speed-change apparatus for the gear transmission according to claim 1, wherein:

gear teeth surface portions, shaft portions, bearing portions of the gears and the tip end portion of the lever and a connector portion constituting said select mechanism and said change speed mechanism are dry structure using a material or a solid lubricant to allow said select mechanism and said change speed mechanism to function without using a liquid lubricant.

3. An automatic speed-change apparatus for a gear transmission connected to a select and change speed pull-rod of the gear transmission having a constitution in which the select and change speed pull-rod is moved in an axial direction to select a line of a change speed fork provided within the gear transmission and a rotation direction of said select and change speed pull-rod cooperates with said change speed fork to complete speed change of a gear, for executing select and change speed operations of the gear transmission, said automatic speed-change apparatus comprising:

a select mechanism for executing said select operation and a change speed mechanism for executing said change speed operation are incorporated into said automatic speed-change apparatus;

said select mechanism comprises a select shaft rotated by a select motor capable of controlling forward and backward rotation, a select sensor provided on an outer end of the select shaft and detecting an operating angle of the select shaft in rotation direction, a select lever fixed to said select shaft and a connector connecting a tip end portion of the select lever to said select shaft;

said change speed mechanism comprises a change speed motor capable of controlling forward and backward rotation; a plurality of intermediate shaft gear mechanisms each having gear specifications such that the gears are spur gears and have modules set at 1 to 3, a pair of reduction ratios are 3 to 6, numbers of gear teeth of the small diameter gears are 10 to 20, numbers of gear teeth of the large diameter gears are 30 to 120 and that a total reduction ratio is 48 to 180, and an intermediate shaft parallel to the select and change speed pull-rod;

a change speed gear engaged with the intermediate shaft gear mechanism to transmit rotation and fixed to said select and change speed pull-rod; and a change speed sensor provided on an outer end of said select and change speed rod and detecting an operating angle of the select and change speed pull-rod in the rotation direction;

during the select operation, when the select motor is actuated, said select shaft rotates in a direction to rock said select lever and to axially move said select and change speed pull-rod through said connector and said select shaft is adjusted by feedback control of said select sensor to thereby allow said select shaft to reach a predetermined select line; and during the change speed operation, when the change speed motor is actuated, said change speed gear is rocked through said intermediate shaft gear mechanisms and said select and change speed pull-rod is deformed in the rotation direction and adjusted by feedback control of said change speed sensor to thereby allow the select and change speed pull-rod to reach a predetermined change speed line.

* * * * *